United States Patent [19]
Reidy

[11] Patent Number: 5,149,446
[45] Date of Patent: Sep. 22, 1992

[54] POTABLE WATER GENERATOR

[76] Inventor: James J. Reidy, 1260 Main St., Holden, Mass. 01520

[21] Appl. No.: 648,541

[22] Filed: Jan. 30, 1991

[51] Int. Cl.$^5$ .................. C02F 1/00; B01D 5/00; F25D 17/06
[52] U.S. Cl. ........................ 210/744; 55/20; 55/21; 55/23; 55/80; 55/97; 55/213; 55/215; 55/217; 55/269; 55/472; 62/93; 62/272; 210/128; 210/251; 210/806
[58] Field of Search .............. 55/20, 21, 23, 80, 97, 55/213, 215, 217, 267, 269, 322, 472; 62/93, 272; 210/104, 128, 137, 149, 251, 258, 741, 742, 744, 806

[56] References Cited

U.S. PATENT DOCUMENTS

| | | | |
|---|---|---|---|
| 4,146,372 | 3/1979 | Groth et al. | 55/80 X |
| 4,235,054 | 4/1988 | Beckey | 62/93 |
| 4,252,003 | 2/1981 | Eckand et al. | 62/93 X |
| 4,319,461 | 3/1982 | Shaw | 62/93 |
| 4,351,651 | 9/1982 | Courneya | 55/267 X |
| 4,505,128 | 3/1985 | Miller et al. | 62/93 X |

Primary Examiner—Charles Hart
Attorney, Agent, or Firm—Iandiorio & Dingman

[57] ABSTRACT

A water generating device for obtaining potable water from inside or outside ambient air, having ducts for bringing a supply of inside or outside ambient air to the device and for releasing the air back outside the device after it has been processed. There is an air filter for filtering the air prior to processing of the air. The air filter includes at least one filter element which becomes unusable when removed from the generator. A condenser is provided for extracting water vapor in the air brought thereto by the ducts. Within the ducts there is a fan or blower to move air from outside the device through the condenser and for returning the air back outside after it has traversed the condenser. Between the condenser and the collection point, there is a water filter for filtering the water from the condenser. The water filter includes a filter element cooperating female sensor which becomes unusable when removed. A container is positioned to receive and collect the water after it leaves the water filter, and there is a water sensor below the top of the container for shutting down the device or activating a pump to carry the water to another location when the container is full of water. A switch is provided for automatically deactivating the device until the nonreusable air filter element is replaced after a predetermined pressure drop in the air before the air filter compared to that of the air after the air filter. A timer is provided for deactivating the device until a nonreusable water filter element is replaced after a predetermined number of hours operation. A thermostat and humidistat are settable in conjunction with each other by a user to minimize energy consumption and maximize water yield. First and second indicators provide a signal when the air filter element and the water filter element are in need of being replaced.

13 Claims, 5 Drawing Sheets

POTABLE WATER GENERATOR

FIELD OF THE INVENTION

The present invention relates to water making apparatus, and, more particularly, to such device which makes potable water.

BACKGROUND OF THE INVENTION

In recent years, it is becoming more usual for people in both offices and in the home to drink bottled water rather than the water from a water tap. Countless other situations exist where water is difficult to obtain or where available water or water quality leaves much to be desired. In many cases this also creates a need to carry and lift heavy bottles of water periodically and to carry the water from the place where it was purchased to the place where it will be used. Accordingly, there have been some attempts to provide water generating devices.

U.S. Pat. No. 1,931,347 to Gay issued Oct. 17, 1933, prepares potable water from a supply of water which is first frozen, to remove impurities. It does not treat water unless it is first frozen.

U.S. Pat. No. 2,409,624 to Granville issued Oct. 22, 1946, is a complicated system for providing water. It is a manually powered and uses the "sulfuric acid system."

U.S. Pat. No. 3,035,418 to Wright issued May 22, 1962, provides water from air, but is lacking in many of the features needed to produce potable water for modern day uses. There is no provision for the safety of being able to use only filters which are properly operable, and also to produce water only when certain temperature/humidity conditions can be met.

U.S. Pat. No. 3,575,009 to Kooney issued Apr. 13, 1971, is to provide rapidly operating water vapor condensing means for use with a laundry clothes dryer. It uses ice as coolant and uses a filtering material designed to remove only lint from the resulting condensed water. The condensed water vapor is claimed to be suitable for use in steam irons or for any "other" purpose requiring water. There are no provisions for obtaining water of any confidant purity level from the ambient air. Also, it has no air filter, has only a coarse water filter, no operational controls except the manually supplied ice filled chill unit, and it can only work during the time that a clothes dryer is operating.

U.S. Pat. No. 3,675,442 to Swanson issued Jul. 11, 1972, is apparatus for recovering potable water from "humid" air. It is thus not designed to operate at all humidity levels, and fresh water is used as a coolant with water pumps. It has no air or water filters and no refined controls. It diverts condensed water vapor to the cool water bath as needed and only the overflow is channeled to another container and is called potable. Swanson does not use a fan or blower to move air through his unit.

U.S. Pat. No. 4,182,132 to Nasser et al issued Jan. 8, 1980, is to operate in hot and humid regions only, and its primary purpose is to cool and dehumidify ambient air in relatively large areas such as a city neighborhood. There is no provision for protecting the purity of the water. It must be taller than the tallest building in the area, requires a foundation recessed in the ground, cannot be in any enclosing structure and must be in an open area free of ground contours, needs at least two air passages, and a heat dissipator in a passageway separate from the passageway containing the air cooler and moisture condenser. It relies on the specific gravity of cold air sinking within the device and hot air rising within the device. It has no air or water filters to protect the water.

U.S. Pat. No. 4,255,937 issued Mar. 17, 1981, provides no operational controls for humidity, temperature, or filter conditions. The device also does not use a blower or fan.

U.S. Pat. No. 4,433,552 to Smith issued Feb. 28, 1984, does not mention potable water, has no air or water filters, requires a turbine, a generator, and wind. It has to be large, may be mounted on a trailer, it cannot be used indoors, there is no provision for protection of the water quality, and no filters, for keeping bugs, dust, etc. out of the water.

U.S. Pat. No. 4,892,570 to Littrell issued Jan. 9, 1990, for agricultural water, and it only operates outdoors, is very large, designed for only high temperature regions, requires a wind of at least 5 mph to operate, is made of stone and cinder blocks, and has no refined controls or filters.

SUMMARY OF THE INVENTION

The present invention provides a potable water generator designed to produce potable water using existing technologies and known devices in a unique combination that safely extracts potable water from the ambient air in a wide range of user definable temperature and humidity conditions.

This invention provides a fine functional air filter to remove impurities from the air, safely, due to the fact that the potable water generator is arranged to assure that only fresh and properly functioning air filters are used. User neglect or abuse is avoided, thereby contributing to safe, pure water. This unit will not work with a malfunctioning air filter.

This invention provides a fine functional water filter to remove impurities, odors, and objectionable taste, as well as other contaminates, safely, due to the fact that the generator is permanently programmed by a time meter to assure that only fresh and properly functioning water filters are used and replaced on a regular timely basis. Each time a water filter is replaced, the timer is automatically reset to zero. User neglect or abuse is avoided, thereby further contributing to safe, pure water. This unit will not work with a water filter exceeding the time meter limits.

Concerning the air filters, these are replaced when needed based upon the pressure drop sensed by a pressure differential indicator. When the pressure drop reaches a predetermined amount, the generator ceases operation until the air filter is replaced to assure that only fresh and properly functioning air filters are used and replaced on a regular, timely basis. User neglect or abuse is avoided, thereby further contributing to safe, pure water. This unit will not work with an air filter exceeding the pressure differential limits.

The frames of both filters contain a cooperating female sensor, which cooperates with a male pin, that deactivates the operation of the entire unit. When either filter is removed for required replacement this original cooperating female sensor is destroyed and/or made irreparable. Only new and safe filters having such structure can be used.

A time meter for the water filter and a pressure differential device for the air filter, as applicable, are programmed to deactivate the entire unit until the filter or filters required to be replaced are in fact replaced. The sensing device will confirm that the appropriate replacement filter or filters have been properly reinstalled and the generator will operate once again. The time span, or filter life, is determined by the particular model, its intended use and location—such as residential, industrial, commercial, construction, marine, recreational, military, and the like.

For those users sensitive to, or conscientious of, energy consumption, the generator includes temperature and humidity gauges as well as a thermostat and humidistat. These devices are intended to be used as follows:

The temperature and humidity gauges will aid the experienced user, as well as the novice in conjunction with a quick reference chart provided with the unit, in determining whether or not they want to operate the unit under present conditions for the likely water yield at that time.

The thermostat and humidistat settings as determined by the user, will allow unattended operation and preclude the need for any user monitoring whatsoever. The user may choose settings that provide only maximum water yield for energy consumed, or those settings that produce water regardless of energy consumed, or, the user may choose one of the infinite settings between these two extremes.

It is expected that needs and priorities within an individual's environment are not static and that the flexibility afforded by these items maximizes the functionality and efficiency of the generator.

A custom designed reusable water condensate container is also an integral safety feature of the generator. It is conceivable that human nature or dire need may prompt the reuse of any container not designed for such purpose and may therefore be unsanitary and even dangerous. All containers in all models of the generator are designed to allow easy and proper cleaning by internal access through a wide neck. In addition, all larger containers will have an optional spigot. Those containers without spigots will transport safer than those having spigots.

Other objects, features, and advantages will be apparent from the following detailed description of preferred embodiments taken in conjunction with the accompanying drawing in which:

DETAILED DESCRIPTION OF THE PREFERRED EMBODIMENTS

Figure 1:
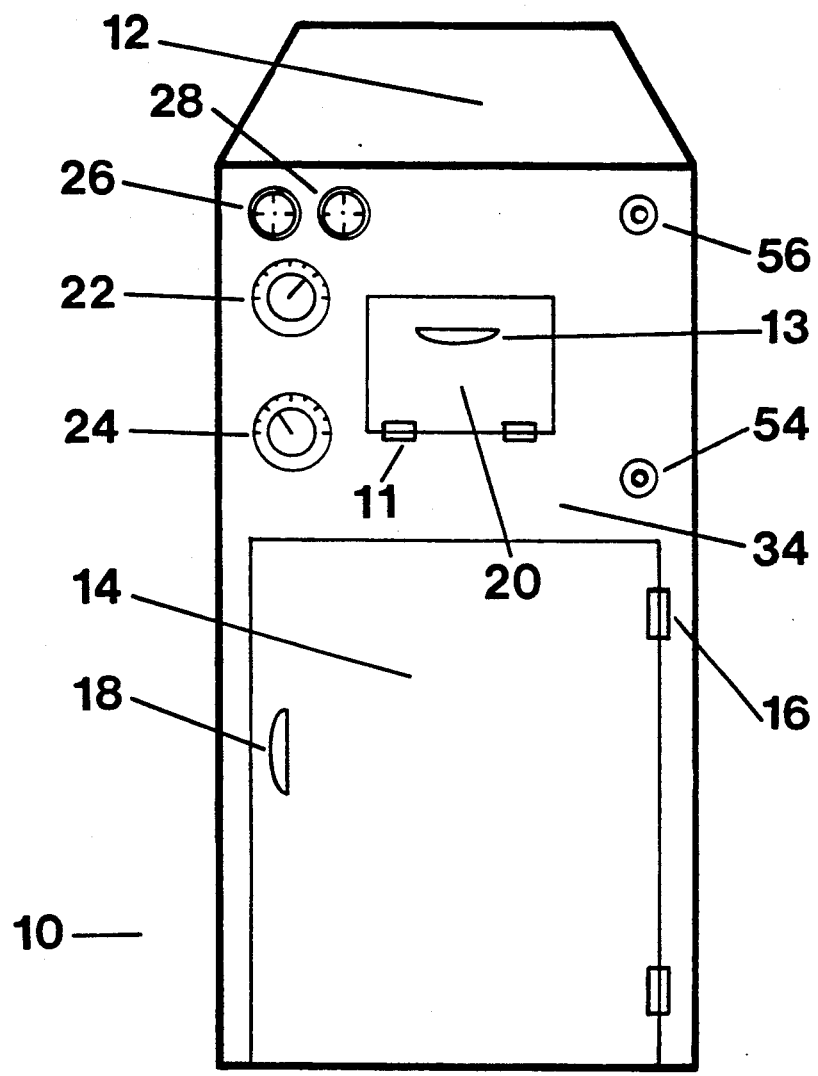
FIG. 1 is a schematic front view of the invention.

The basic device 10 as shown in FIG. 1 is enclosed in a cabinet 12 which houses the entire apparatus except for certain duct work on some models which needs to be external of the device as explained below. The cabinet 12 has a lower door 14 which is hinged at 16 and has a handle 18 with which this door can be opened to provide access to the inside of the device including the water filter element and the water container and/or temporary reservoir.

The upper end of the cabinet 12 has a small door 20 in the middle for providing access to the air filter element. It is hinged at 11 and has a handle at 13. There are two settable switches 22 and 24 which are a thermostat 22 to measure the temperature and open or close when a predetermined temperature is attained, and a humidistat 24 to measure the humidity and open or close when a predetermined humidity is attained. Above the switches there are two gauges 26 and 28 which are temperature and humidity gauges, respectively, for manual on/off operations, and which are an aid to determine the immediate water yields in conjunction with a simplified quick reference chart supplied with this device, i.e., the chart shown in FIG. 5.

Figure 2:
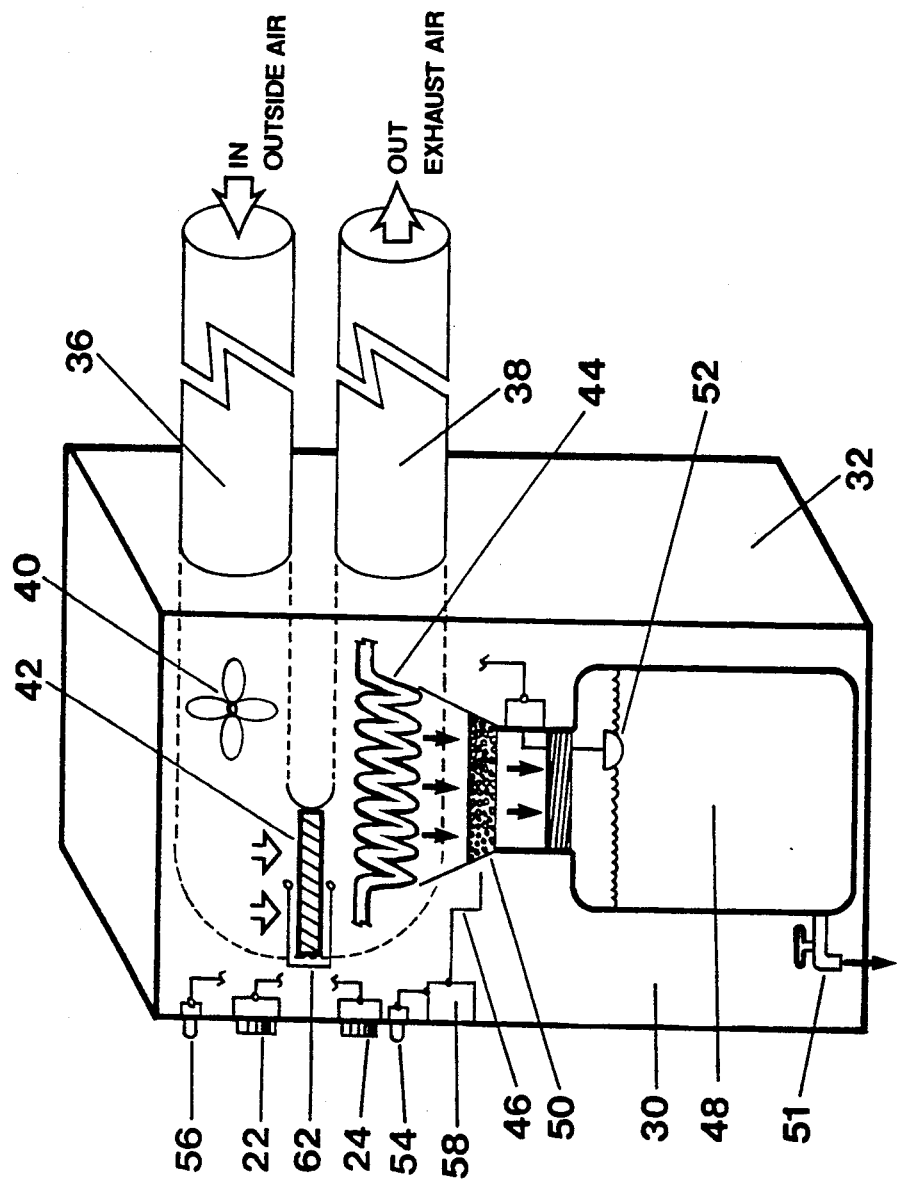
FIG. 2 is an isometric view of the device with parts broken away for clarity.

More details of the device are visible in FIG. 2 in which portions of the cabinet 12 walls have been broken away for clarity. The cabinet 12 has a side walls 30, a rear wall 32, and front wall 34. An inlet duct 36 and an outlet duct 38 are provided to direct ambient air through the device by means of the two ducts which are connected with one another inside the cabinet. These ducts can be located through an outside wall in some models. There can also be floor or countertop models in addition to the model illustrated herein, which fit into the kitchen cabinetry and which may have side venting arrangements. There is a fan or blower 40 which assists in bringing ambient air into the device. The air first passes through an air filter element 42 and then through the coils 44 of a condenser 46 to cool the air sufficiently to remove water vapor by condensation. There is a cooperating female sensor blocks orifice 86 (FIG. 3) when removed and is not reusable. This feature, for example, can be made of plastic and is described in more detail below.

This water condensate falls down into a collection container 48 after first passing through the filter element 50 of a water filter. This container or reservoir is designed to be reusable and has a wide throat for easy cleaning. As an option there is also a spigot 51. The cooperating female sensor is modified when the filter is first inserted into place which prevents further use of this used filter once it is removed from the filter holder. This feature will be described in more detail below. There is a sensor device 52 inside the container and below the top, for shutting the machine down when the container or reservoir 48 is full, to prevent overflowing. An optional audible alarm can be set to sound whenever the container or reservoir is filled with water. Another arrangement pumps the water from a larger second automatic collection container to a larger external container which acts as a reservoir. This can be done with a pump and a Y connection.

A light 54 will turn on or flash whenever the water filter is in need of being changed. There is another light 56 which will turn on whenever the air filter is in need of being changed. A separate time meter 58 may be set to deactivate the unit until the non-reusable water filter is replaced after a predetermined number of hours of operation. A second separate sensor device 62 may be used which deactivates the unit until the non-reusable air filter is replaced after a predetermined pressure drop from one side of the air filter to the other, and which increases with time. Thus, the air filter can be arranged with a device 62 for measuring the air pressure both upstream and downstream of the air filter and when the differential reaches a predetermined point, the device will shut down until the air filter is replaced. This is based upon the air flow downstream decreasing as the filter becomes more filled with filtered material and provides efficient use and prevents waste of energy.

Figure 3:
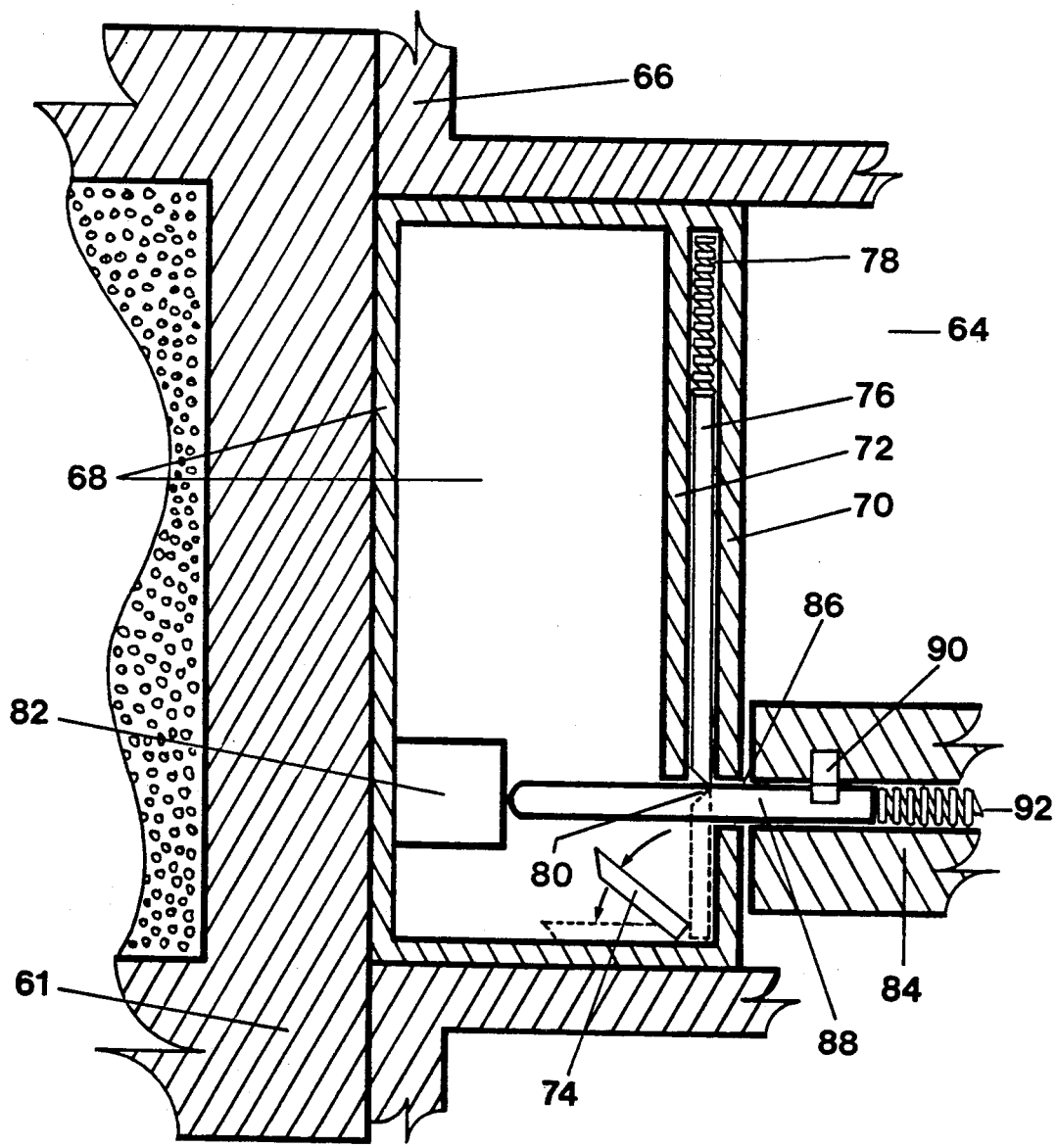
FIG. 3 is a plan view of the cooperating female sensor which is integrated into the filter frame and allows only one-time use.

As shown in FIG. 3 in plan view the filter 42 or 50 is held in a frame 61, and has a one-time use cooperating female sensor 64 attached thereto. This female sensor 64 fits into a special place in the back of the normal filter guide channels 66 as are frequently provided for holding filters. The female sensor 64 is provided with a basic chassis 68 having a back wall 70, and a retaining wall 72 spaced slightly therefrom and providing sufficient space for holding a "trap door" arrangement including two pieces 74 and 76 weakly connected together along line 80, and they are located in the space between the back wall 70 and the retaining wall 72. The trap door 74, 76 is biased downwardly by compression spring 78.

The female sensor 64 has a stop block 82 on the wall opposite the one containing the trap door opening 86. There is a frame 84 on the generator which slidably holds a pin 88 which is biased toward the filter by compression spring 92. There is an electrical contact 90 which is closed when the pin is in a certain location within the frame 84 held in precise horizontal position by spring 92 holding it against stop block 82. The trap door has a lower part 74 which breaks away when pin 88 is inserted into chassis 68 through opening 86, and an upper part 76 which is held in its original position by pin 88 until the filter with attached sensor 64 is removed. Then, compression spring 78 forces part 76 down and holds it there, sealing opening 86, preventing further use of this filter.

Figure 4:
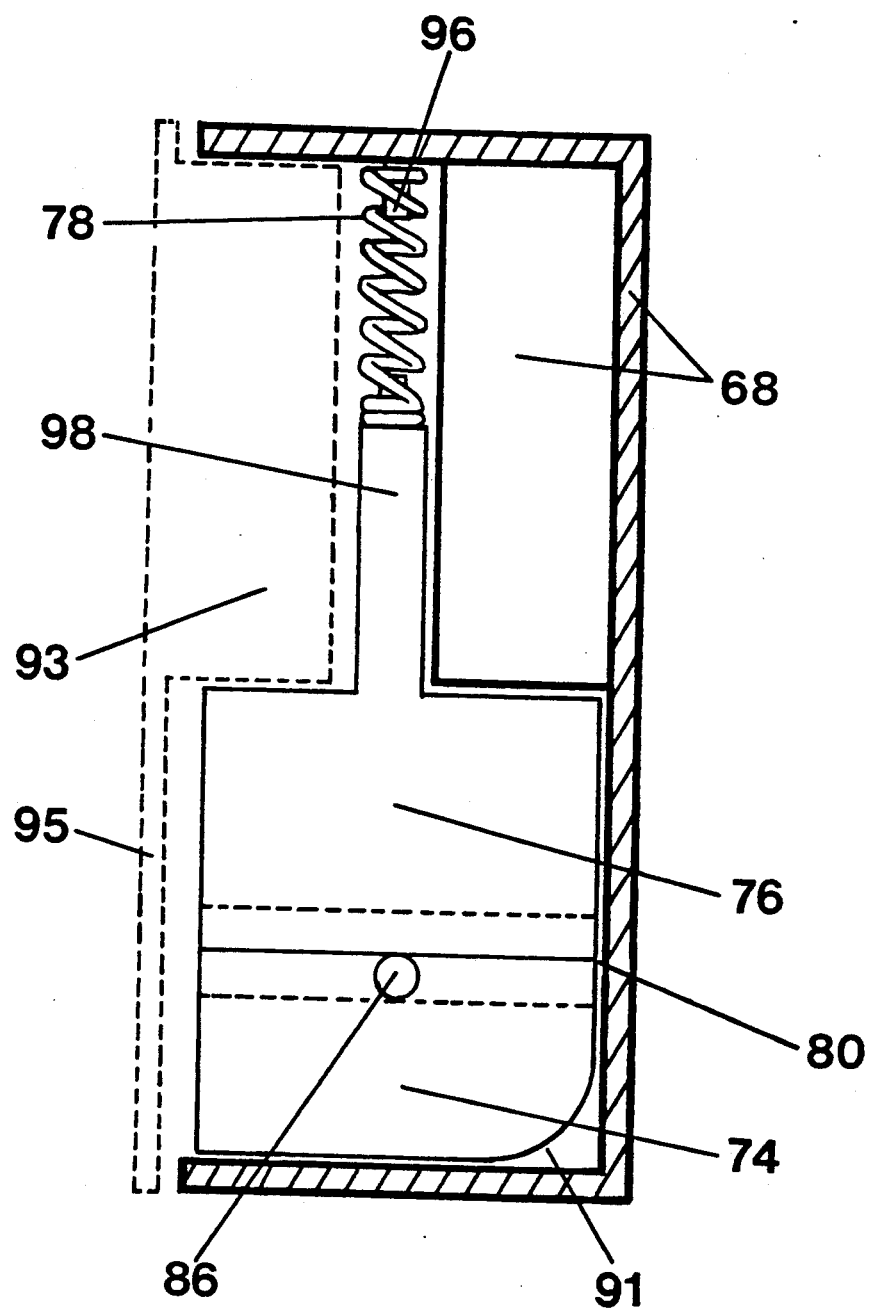
FIG. 4 is a front view of the cooperating female sensor illustrated in FIG. 3.

FIG. 4 shows the one-time use cooperating female sensor from the front. The sensor basic chassis 68 is shown as is the compressed spring 78. There is a nipple 96 or other guiding parts which holds the spring 78 when it is uncompressed in position during assembly, and the nipple is attached to the chassis. There is another longer nipple 98 attached to part 76 at the bottom end of the spring 78 which holds this spring while it is being compressed by the insertion of the trap door. There is a top piece 95 which permanently seals the entire chassis. The final assembly piece 95 of the entire device, is shown partially inserted. There is a retaining block 93 which is also part of assembly piece 95 and aids in holding the upper part of the trap door in position open or closed, including spring 78. The interior of the trap door is "chiselled" to create a weak breaking point. The bottom end of the trap door has a modified corner 91 to allow insertion of the trap door while compressing the spring 78 from an angled starting position.

When the filter is entered into its correct position the pin or male sensor 88 which projects out of its frame 84 engages the trap door through an opening 86 in the rear wall 70. The unit will only operate when pin 88 is in its precise, but only partially extended, position as precisely determined by block 82. Also, upon pressing of the filter into place, the trap door breaks and the shorter part 74 falls over onto the bottom and the upper part 76 slides down due to pressure from compression spring 78 and remains resting upon the top of the pin 88. When it is time to remove the filter, it is removed and the compression spring 78 forces part 76 downwardly until it reaches the bottom, and it thereafter remains in this position. If it should be attempted to place this same filter into this same location, it cannot be done because the outwardly extending pin 88 will not go beyond wall 70 as it will be blocked by the trap door upper part 76. Thus, the filter cannot be reused. When the filter is first placed into position, the pin 88 breaks the trap door, and the lower part of it which is at first in a vertical position as shown in dashed lines, moves into and through the solid line position of the part and it then falls down horizontally where it thereafter remains.

Figure 5:
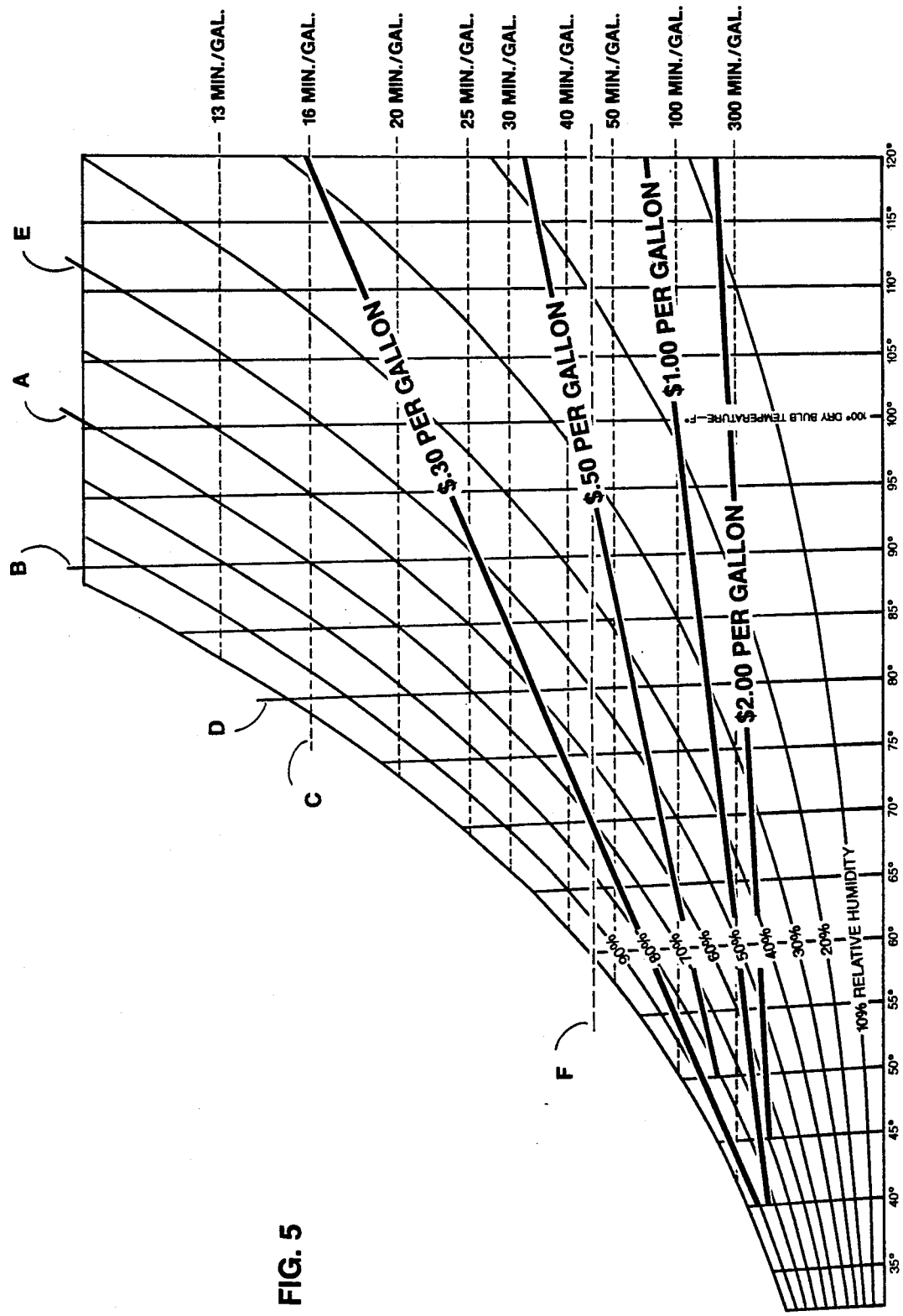
FIG. 5 is a chart of temperature and humidity on a scale which includes the approximate time and cost of producing a gallon of water.

FIG. 5 provides a chart showing various ambient conditions and has added thereto the approximate number of minutes to produce one gallon of water at the temperature and relative humidity conditions indicated. Also, the approximate cost of energy to make a gallon of water is calculated at an assumed cost of 10¢/KWH. Thus, if the humidistat was set for 70% relative humidity, which is the curve designated A in FIG. 5, and the thermostat was set for 90° F. (which is the line designated B), the device would produce a gallon of water in 16 minutes and at a cost of about 30¢/gal. as shown at line C in FIG. 5. A second example in FIG. 5 shows line D indicating a thermostat setting at 80° F., and line E indicating a humidistat relative humidity setting of 50%, which results in the production of a gallon in approximately 45 minutes as designated by line F and at an approximate cost of 60¢ per gallon. The settings of the humidistat and thermostat assure that the device will operate only when the ambient air is within the conditions set.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

I claim:

1. A water generating device for obtaining potable water from ambient air, comprising:
   air passage means for bringing a supply of inside or outside ambient air to the device and for returning the air back after it has been processed;
   air filter means for filtering the air prior to processing of the air;
   condenser means for extracting water vapor in the air brought thereto by the duct means;
   water filter means for filtering the water from the condenser means; and
   container means positioned to receive and collect the water after it leaves the water filter means; and
   said air filter means and said water filter means each including a filter element having means for permitting use of the filter element only one time so that the filter element is not reusable when it is removed.

2. A water generating device as defined in claim 1, further comprising blower means inside the duct means to move air from outside the device through the condenser means and for returning the air back outside the device after it has traversed the condenser means.

3. A water generating device as defined in claim 2, wherein said filter one-time use means including a plunger on the device and a scored flat element which is broken when the filter element is inserted into place, so that when the filter element is removed, the top portion of said flat element moves downwardly and prevents reinsertion of said filter due to the plunger hitting the flat element.

4. A water generating device as defined in claim 3, where the plunger closes a contact when a new filter is inserted and completes a circuit which permits the device to operate.

5. A water generating device as defined in claim 2, further comprising a water sensor below the top of said container means for shutting down the device when the container means is full of water.

6. A water generating device as defined in claim 2, further comprising a water sensor below the top of said container means for activating a pump when the container means is full of water to move the water to another location.

7. A water generating device as defined in claim 3, further comprising a pressure sensitive differential switch for deactivating the device until a nonreusable air filter element is replaced after a predetermined drop in air pressure.

8. A water generating device as defined in claim 3, further comprising a time meter for deactivating the device until a nonreusable water filter element is replaced after a predetermined number of hours of operation.

9. A water generating device as defined in claim 2, further comprising thermostat means and humidistat means which are settable in conjunction with each other by a user to minimize energy consumption and maximize water yield.

10. A water generating device as defined in claim 2, further comprising a thermometer and humidity indicator for manual use of the device.

11. A water generating device as defined in claim 2, further comprising first and second indicator means for providing a signal when the air filter element and the water filter element are in need of being replaced.

12. A water generating device for obtaining potable water from inside or outside ambient air, comprising:
   air passage means for bringing a supply of inside or outside ambient air to the device and for returning the air back after it has been processed;
   air filter means for filtering the air prior to processing of the air, said air filter means including a cooperating female sensor which renders the air filter useless when removed;
   condenser means for extracting water vapor in the air brought thereto by the air passage means;
   blower means inside the air passage means to move air from outside the device through the condenser means and for returning the air back outside the device after it has traversed the condenser means
   water filter means for filtering the water from the condenser means, said water filter means including a cooperating female sensor which renders the water filter useless when removed;
   container means positioned to receive and collect the water after it leaves the water filter means;
   water sensor means below the top of said container means for shutting down the device when the container means is full of water or for activating a pump
   pressure differential means for deactivating the device after a predetermined pressure drop in operation until this nonreusable air filter element is replaced;
   timing means for deactivating the device after a predetermined number of hours of operation until the nonreusable water filter element is replaced;
   thermostat means and humidistat means which are settable in conjunction with each other by a user to minimize energy consumption and maximize water yield;
   thermometer and humidity indicators for providing a visual measure of the temperature and relative humidity of the air passing through the device; and
   first and second indicator means for providing a signal when the air filter element or the water filter element are in need of being replaced.

13. A water generating method for obtaining potable water from inside or outside ambient air, comprising:
   bringing a supply of inside or outside ambient air to a first station and for releasing the air back after it has been processed;
   filtering the air through a filtering element prior to processing of the air, said air filter element becoming useless when removed;
   extracting water vapor in the air brought to the first station;
   moving air from outside the device through the first station and for returning the air back outside the first station;
   filtering the water from the extracting step through a filtering element, which becomes useless when removed;
   collecting the water at a collecting station after it is filtered;
   sensing the water level at the collecting station below the top of the collecting station for shutting down the process or activating a pump when the collecting station is full of water;
   deactivating the device when the air filter element is to be replaced and until this nonreusable air filter element is replaced after a preselected pressure drop;
   deactivating the device when the water filter element is to be replaced and until this nonreusable water filter element is replaced after a predetermined time;
   detecting the temperature and the relative humidity of the air brought to the first station and using this information in accordance with predetermined conditions to initiate and cease the process to minimize energy consumption and maximize water yield according to parameters chosen by the user; and
   providing a signal and deactivating the unit when the air filter element or the water filter element are in need of being replaced.

* * * * *